United States Patent [19]

Sugimoto

[11] 4,083,742
[45] Apr. 11, 1978

[54] PROCESS FOR PRODUCING ORNAMENTAL STANDING TOYS

[76] Inventor: Takehiko Sugimoto, 240 Nakazato-Cho, Kita-Ku, Tokyo, Japan

[21] Appl. No.: 719,908

[22] Filed: Sep. 2, 1976

[30] Foreign Application Priority Data

Apr. 28, 1976 Japan .................................. 51-49124

[51] Int. Cl.² ............................................. B32B 31/00
[52] U.S. Cl. ..................... 156/227; 46/117;
46/157; 156/251; 156/258; 156/261; 156/267;
156/290; 156/292; 428/158; 428/162
[58] Field of Search ............... 156/204, 217, 221, 222,
156/226, 227, 251, 258, 261–267, 290, 292;
428/121, 159, 162, 170, 178, 187, 15; 46/117,
151, 157

[56] References Cited

U.S. PATENT DOCUMENTS

| | | | |
|---|---|---|---|
| 1,610,156 | 12/1926 | Riley et al. | 156/227 |
| 2,487,546 | 11/1949 | Harrowe | 46/117 |
| 2,684,923 | 7/1954 | Harrison | 156/227 |
| 3,028,576 | 4/1962 | Gerard | 156/251 |
| 3,758,358 | 9/1973 | Kuroda | 156/251 |

Primary Examiner—William A. Powell
Attorney, Agent, or Firm—Woodling, Krost, Granger & Rust

[57] ABSTRACT

A process for producing ornamental standing toys in which a rectangular laminated synthetic resin sheet comprising a foam synthetic resin core sandwiched in between a pair of weldable synthetic resin layers adhered to the opposite surfaces of said core and bearing a series of patterns of toys printed in symmetry with respect to the longitudinal center line is provided, a high frequency welder is applied against said sheet to cut selected portions of said patterns of toys from said sheet and simultaneously to weld said weldable layers sandwiching said core together along the peripheral edges of the selected portions of the patterns to form portions of the toys, said sheet is folded along said longitudinal center line and another high frequency welder is applied against said sheet to cut the remaining portions of said patterns of toys from the sheet and simultaneously to weld said weldable layers sandwiching said core together along the edges of the remaining portions of the patterns of toys to thereby complete the toys.

3 Claims, 8 Drawing Figures

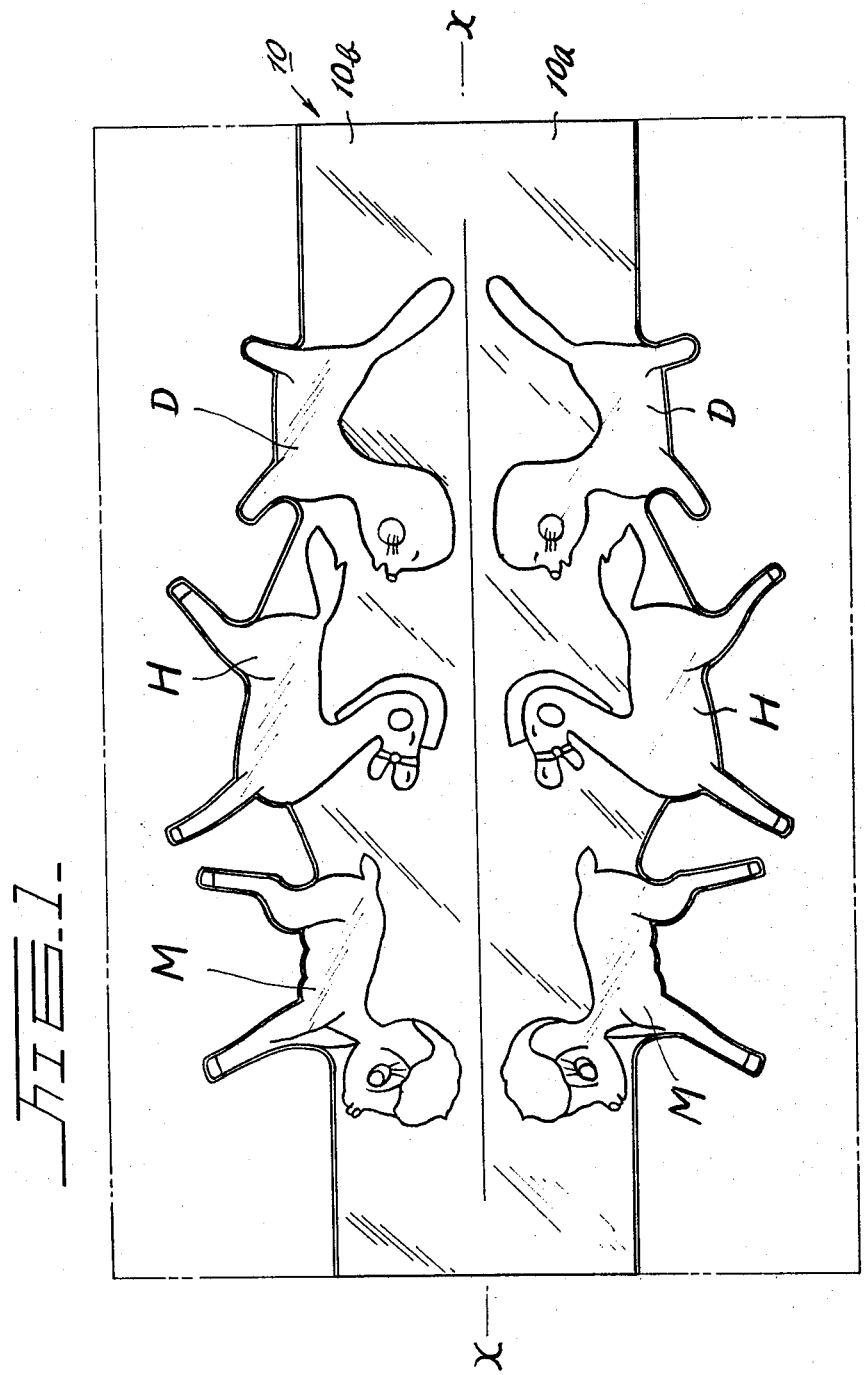

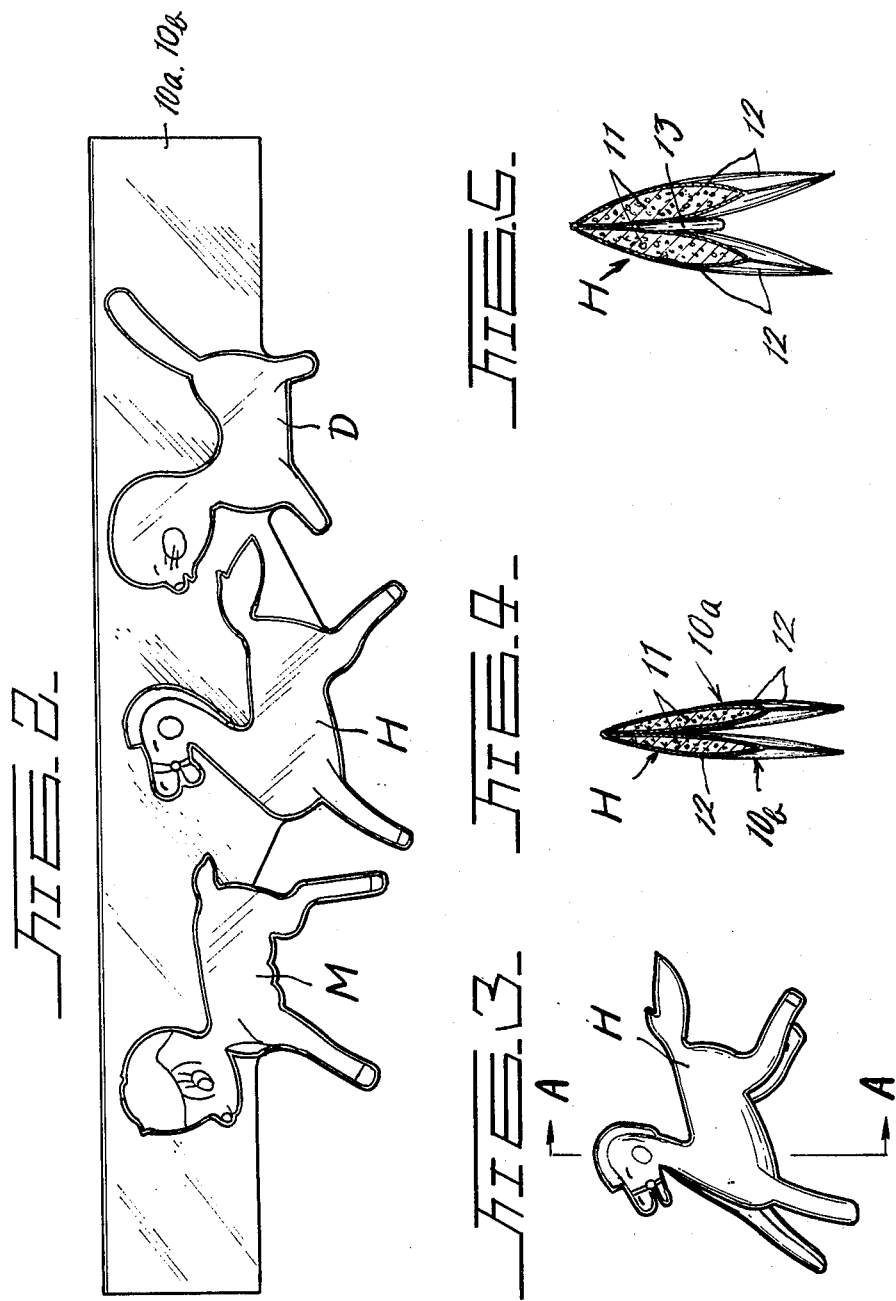

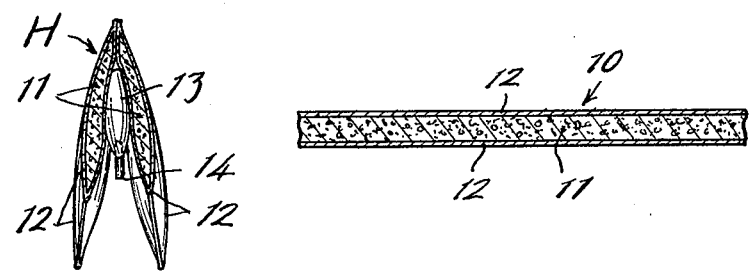
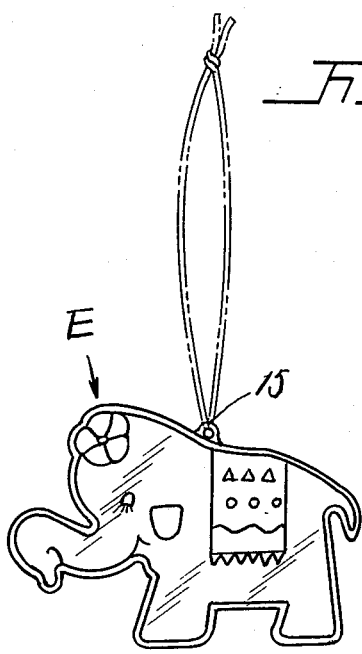

PROCESS FOR PRODUCING ORNAMENTAL STANDING TOYS

BACKGROUND OF THE INVENTION

This invention relates to a process for producing ornamental standing toys and more particularly, to a process for producing a plurality of ornamental standing toys simultaneously in a mass production system.

I have previously proposed a process for producing ornamental standing toys in which a pair of similar laminated synthetic resin sheets bearing symmetrical patterns of similar toys and each comprising a foam synthetic resin core sandwiched in between a pair of weldable synthetic resin layers are provided, an electrically heated pattern welder having a contour corresponding to that of a portion of the pattern is applied against one of the sheets to cut a portion of the pattern from the sheet and simultaneously to weld the weldable synthetic resin layers sandwiching the foam resin core together along the peripheral edge of the cut pattern portion, the same welder is then applied against the other sheet to cut the similar portion of the toy pattern on the other sheet which is symmetrical to that on the one sheet from the associated sheet and simultaneously to weld the weldable synthetic resin layers sandwiching the foam synthetic resin core of the other sheet together along the peripheral edge of the cut pattern portion, the two sheets are placed one upon another with the cut pattern portions positioned in registry with each other and finally, another electrically heated welder having a contour of the remaining portion of the toy pattern on each of the sheets is applied against the sheets to cut the remaining portion of the toy pattern on the upper sheet and also the corresponding portion of the toy pattern on the underlying sheet from the sheets and simultaneously to weld the weldable synthetic resin layers sandwiching the foam synthetic resin core together along the peripheral edge of the remaining portion of the toy pattern on each sheet to thereby complete an ornamental standing toy.

The thus produced ornamental standing toy eliminates the monotony inherent in the conventional flat ornamental standing toys and is more stable in standing. Furthermore, the ornamental standing toy produced by the process previously proposed by me possesses excellent properties such as enhanced appearance and reality. However, the previously proposed process for producing ornamental standing toys requires a number of rather tedious steps such as separate cutting-off and welding for a selected portion of the toy pattern on each sheet, aligning of the cut portions of the toy patterns on the two sheets and separate cutting-off and welding of the remaining portions of the toy patterns and in consequence, the previously proposed process is inefficient and relatively expensive.

Therefore, the present invention is to provide a process for producing ornamental standing toys which can effectively eliminate the disadvantages inherent in the conventional process for producing ornamental standing toys and which can produce a plurality of ornamental standing toys simultaneously eliminating the steps of separate cutting-off and welding for each sheet and alignment of cut portions of toy patterns. The ornamental standing toys produced by the process of the invention are more three dimensional and more stable in standing as compared with the ornamental standing toys produced by the previously proposed process.

The above and other objects and attendant advantages of the present invention will be more readily apparent to those skilled in the art from a reading of the following detailed description in conjunction with the accompanying drawings which show one preferred embodiment of the present invention for illustration purpose only, but not for limiting the scope of the same in any way.

BRIEF DESCRIPTION OF THE DRAWINGS

FIG. 1 is a plan view of a laminated synthetic resin sheet which bears patterns of animals from which ornamental standing toys are produced in accordance with the process of the present invention;

FIG. 2 is a plan view of said laminated synthetic resin sheet after the sheet has been folded along the X — X or longitudinal center line of FIG. 1;

FIG. 3 is a perspective view of one ornamental standing toy produced by utilizing a pair of symmetric or complemental patterns selected from the patterns as shown in FIG. 1 in accordance with the process of the present invention;

FIG. 4 is a cross-sectional view taken along substantially the line A — A of FIG. 3;

FIG. 5 is similar to FIG. 4, but shows a modified ornamental standing toy having a padding inserted between the complemental parts;

FIG. 6 is similar to FIG. 5, but shows a modified padding having a whistle incorporated therein;

FIG. 7 is a longitudinal sectional view of a portion of said laminated synthetic resin sheet of FIG. 1; and FIG. 8 is a side elevational view of an ornamental standing toy which has a hanging ring and concurrently serves as a pendant produced by the process of the present invention.

PREFERRED EMBODIMENT OF THE INVENTION

The process of the present invention will be now described referring to the accompanying drawings and more particularly, to FIG. 1 in which a rectangular laminated synthetic resin sheet from which ornamental standing toys are produced is generally shown by numeral 10. The laminated sheet 10 comprises a foam synthetic resin core 11 sandwiched in between a pair of weldable synthetic resin layers 12 which are formed of vinyl chloride, for example and suitably adhered to the opposite surfaces of the core 11. The sheet 10 having the above-mentioned laminar structure consists of similar two half portions 10a, 10b which are connected together along the longitudinal center or folding line X — X of the sheet 10 and one of the layers 12 bears a plurality of spaced patterns of animals such as a monkey, a horse and a dog printed on one surface, for example. The patterns of one half portion 10a are in symmetrical relationship to the respectively corresponding patterns of animals of the other half portion 10b with the heads of the respectively symmetric animals positioned in opposing relationship. Each of the two half portions 10a, 10b of the laminated synthetic resin sheet 10 tapers on the opposite surfaces from the center of the width of the associated half portion toward both the inner side edge or the folding line X — X of the sheet 10 and the outer side edge. The monkey, horse and dog patterns of the two half portions 10a, 10b of the laminated synthetic resin sheet 10 are assigned thereto reference characters M, H and D, respectively.

In carrying out the process for producing ornamental standing toys of the present invention, first of all, a high frequency welder (not shown) provided with welding means having contours corresponding to those of outer portions of the animal patterns M, H and D on the two half portions, respectively, that is, the portions including the legs and the lower half portions of the bodies of these animals, respectively, is applied against the half portions 10a, 10b under pressure with the respective welding means in precise registration with the lower half portions of the respectively corresponding animal patterns to cut the lower portions of the animal patterns M, H and D off from the sheet half portions 10a, 10b and simultaneously to weld the weldable layers 12, 12 sandwiching the foam synthetic resin core 11 along the peripheral edges of the outer portions of the symmetric animal patterns M, H and D to thereby form the legs and the lower half portions of the animal bodies. Next, the sheet 10 is folded along the folding line X — X to place one of the sheet half portions upon the other. Finally, another high frequency welder (not shown) provided with welding means having contours corresponding to those of the remaining portions of the animals patterns M, H and D, respectively, that is, the portions including the heads and the upper portions of the bodies of the respective animals, is applied against the folded half portions 10a, 10b to cut the remaining portions of the animal patterns off from the sheet half portions and simultaneously to weld the weldable layers 12, 12 sandwiching the foam resin core 11 along the peripheral edges of the remaining portions of the animal patterns M, H and D while maintaining the previously formed symmetric legs and body lower portions of the animals in precise registration with each other to thereby complete ornamental standing toys patterned after the different animals.

One complete ornamental standing toy in the form of a horse is shown in FIG. 3. The thus obtained ornamental standing toy has an improved stability in standing because its legs have three-dimensional configuration and incline outwardly due to the taper of the opposite surfaces of the sheet half portions 10a, 10b.

In order to further increase the stability of the ornamental standing toy, according to the present invention, a padding 13 having an oval cross-section is inserted between the complementary parts which in combination form the body of each animal immediately after the laminated sheet 10 has been folded along the line X — X to increase the distance between the legs in pairs to thereby further improve the stability of the ornamental standing toy in standing.

And in order to give more amusement to the infant who plays with the ornamental standing toy, according to the present invention, a whistle 14 may be combined with the padding 13 and when the playing infant squeezes the toy in the body portion, the whistle blows.

As clear from the foregoing description of one preferred example of the process for producing ornamental standing toys, a rectangular laminated synthetic resin sheet comprising a foam synthetic resin core sandwiched in between a pair of weldable synthetic resin layers suitably adhered to the opposite surfaces of the core and bearing a series of spaced patterns of toys printed in symmetry with respect to the longitudinal center or folding line is provided. A high frequency welder provided with welding means having contours corresponding to those of portions of toy patterns, is applied against the pattern portions to remove the material of the sheet surrounding the pattern portions and simultaneously to weld the weldable synthetic resin layers sandwiching the core along the peripheral edges of the pattern portions to thereby form portions of ornamental standing toys. The laminated sheet is then folded along the longitudinal center line and thereafter, a different high frequency welder provided with welding means having contours corresponding to those of the remaining portions of the toy patterns is applied against the remaining portions of the toy patterns to remove the material of the sheet surrounding the remaining portions of the patterns and simultaneously to weld the weldable resin layers sandwiching the foam resin core along the peripheral edges of the remaining portions of the toy patterns while the previously formed symmetric portions of the toys being maintained in registration with each other to thereby complete ornamental standing toys. As mentioned hereinabove, since each of the half portions of the laminated synthetic resin sheet tapers on the opposite surfaces toward its opposite side edges, various parts of a complete ornamental standing toy have a three-dimensional structure which gives a more reality to the animal toy. Furthermore, according to the present invention, since a plurality of toys are produced simultaneously by the use of welding means having contours corresponding to those of these toys, the process of the invention is applicable to a mass production system to thereby attain reduction in production cost.

Furthermore, if desired, a padding having an oval cross-section may be inserted between the complemental portions of the toy to increase the stability of the toy in standing. Similarly, a whistle may be incorporated in the padding to give a great amusement to the infant who plays with the toy.

FIG. 8 shows another example of ornamental standing toy in the form of an elephant E which is provided with a hanging ring 15 through which a string is passed so that the toy can be employed as a pendant.

While only one embodiment of the invention has been shown and described in detail it will be understood that the same is for illustration purpose only and not to be taken as a definition of the invention, reference being had for the purpose to the appended claims.

What is claimed is:

1. A process for producing ornamental standing toys comprising the steps of providing a rectangular laminated synthetic resin sheet comprising a foam synthetic resin core sandwiched in between a pair of weldable synthetic resin layers and including a pair of opposite half sheet portions connected together along the longitudinal center line of said sheet and each bearing a series of laterally spaced patterns of toys printed on one surface in symmetrical relationship to the corresponding patterns on the other half portion, cutting selected portions of said symmetrical patterns from said two half sheet portions and simultaneously welding said weldable synthetic resin layers together along the peripheral edges of said cut selected portions of the symmetrical patterns to form separate selected portions of said ornamental standing toys, folding said sheet along said center line, and cutting the remaining portions of said symmetrical patterns from said two half sheet portions and simultaneously welding said weldable resin layers along the peripheral edges of the remaining portions of the symmetrical patterns on the two half sheet portions to complete said ornamental standing toys.

2. The process as set forth in claim 1, in which said process further includes the step of inserting paddings having an oval cross-section between said remaining portions of the symmetrical patterns immediately after said sheet has been folded along said center line.

3. The process as set forth in claim 1, in which said process further includes the step of inserting paddings having an oval cross-section and provided with whistles between said remaining portions of the symmetrical patterns immediately after said sheet has been folded along said center line.

* * * * *